(12) United States Patent
Hoogerbrugge

(10) Patent No.: US 7,577,823 B2
(45) Date of Patent: Aug. 18, 2009

(54) WAKE-UP AND SLEEP CONDITIONS OF PROCESSORS IN A MULTI-PROCESSOR SYSTEM

(75) Inventor: Jan Hoogerbrugge, Eindhoven (NL)

(73) Assignee: NXP B.V., Eindhoven (NL)

( * ) Notice: Subject to any disclaimer, the term of this patent is extended or adjusted under 35 U.S.C. 154(b) by 596 days.

(21) Appl. No.: 10/519,649

(22) PCT Filed: Jun. 23, 2003

(86) PCT No.: PCT/IB03/02849

§ 371 (c)(1),
(2), (4) Date: Dec. 30, 2004

(87) PCT Pub. No.: WO2004/006097

PCT Pub. Date: Jan. 15, 2004

(65) Prior Publication Data

US 2006/0069738 A1  Mar. 30, 2006

(30) Foreign Application Priority Data

Jul. 3, 2002  (EP) .................................. 02077637

(51) Int. Cl.
G06F 15/76 (2006.01)
(52) U.S. Cl. .......................................... 712/43; 712/10
(58) Field of Classification Search .................... 712/10, 712/203, 43
See application file for complete search history.

(56) References Cited

U.S. PATENT DOCUMENTS

| | | | | |
|---|---|---|---|---|
| 4,747,041 A | * | 5/1988 | Engel et al. .................. 713/324 |
| 5,182,810 A | * | 1/1993 | Bartling et al. .............. 713/323 |
| 5,754,436 A | * | 5/1998 | Walsh et al. ................. 713/300 |
| 6,158,000 A | * | 12/2000 | Collins .......................... 713/1 |

\* cited by examiner

*Primary Examiner*—Alford W Kindred
*Assistant Examiner*—Benjamin P Geib

(57) ABSTRACT

The present invention relates to a multi-processor computer system comprising
  at least two processors for parallel execution of processes,
  at least two cache memory units, each being associated with and connected to a separate processor,
  a connection bus connecting said processors and said cache memory units, and
  a process list unit connected to said connection line for storing a process list of processes to be available for execution by said processors.

Figure 1:
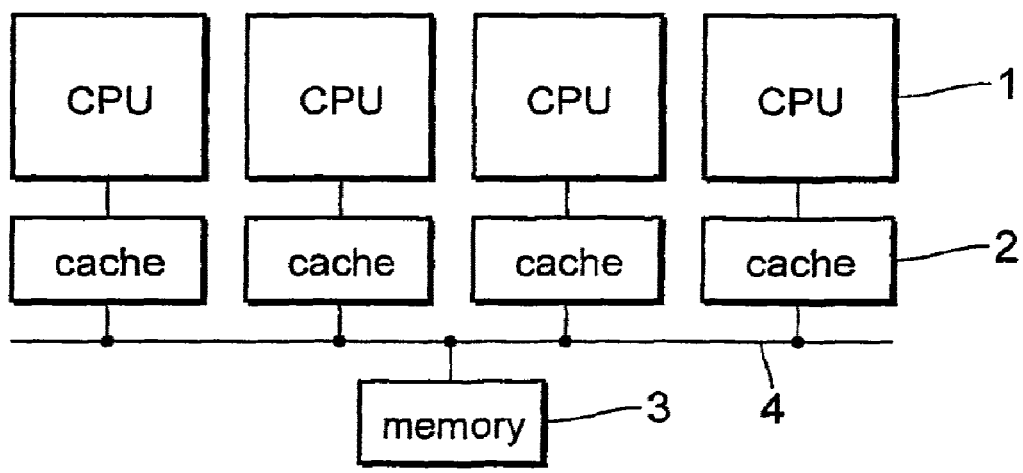

In order to enable power saving if no processes for execution are available while guaranteeing a fast wake-up procedure if such processes are available it is proposed according to the present invention that said processors are adapted for loading a global wake-up variable signalling process additions of processes to said process list into their associated cache memory unit, for switching into a low-power mode if said process list contains no process for execution by said processors and for switching into a normal-power mode if said wake-up variable signals an addition of a process to said process list.

Thus, according to the present invention the cache coherence protocol is used for communicating and signalling the availability of processes for execution.

8 Claims, 3 Drawing Sheets

WAKE-UP AND SLEEP CONDITIONS OF PROCESSORS IN A MULTI-PROCESSOR SYSTEM

The present invention relates to a multi-processor computer system comprising at least two processors for parallel execution of processes, at least two cache memory units, each being associated with and connected to a separate processor, a connection bus connecting said processors and said cache memory units, and a process list unit connected to said connection line for storing a process list of processes to be available for execution by said processors.

Further, the present invention relates to a corresponding processor, a method of scheduling the execution of processes and a method of executing the process by a processor in such a multi-processor computer system. Still further, the present invention relates to a computer program for implementing said methods.

Multi-processor computer systems execute multiple processes in parallel. Each processor repeatedly selects a process that is ready for execution and executes it until the process blocks or, in the case of pre-emptive scheduling, the time slice of the running process expires. When there is no process ready for selection by a processor or, particularly, its associated scheduler, the processor or its scheduler, respectively, waits in a spin loop until a ready process which is ready for execution becomes available in the process list. A ready process becomes available by an unblocking operation, e.g. a V semaphore operation, executed by a process running on another processor.

In order to save power consumption, it is preferred to let the processor switch to a low-power or sleep mode rather than letting it spin until a ready process becomes available. However, it is important that other processors can wake-up sleeping processors without a large overhead. The standard way to wake-up a processor out of the sleeping mode is to send an interrupt to it. The overhead of this method can be large for many parallel applications that have a fine-grain synchronization.

It is therefore an object of the present invention to provide a multi-processor computer system, a corresponding processor, a method of scheduling the execution of processes and a method of executing a process by a processor therein which provide a fast and efficient way of executing processes wherein processors can be switched between a low-power mode and a normal-power mode within a very short time and without a large overhead.

This object is achieved according to the present invention by a multi-processor computer system as claimed in claim 1, wherein said processors are adapted for loading a global wake-up variable signalling process additions of processes to said process list into their associated cache memory unit, for switching into a low-power mode if said process list contains no process for execution by said processors and for switching into a normal-power mode if said wake-up variable signals an addition of a process to said process list.

The present invention is based on the idea to use the cache coherence protocol to wake-up sleeping processors. Cache coherence protocols are designed to communicate much faster than interrupts and therefore allow it to wake-up sleeping processors in a very efficient and fast way. A global wake-up variable is introduced according to the invention which is held by the cache memory units of the processors. Said wake-up variable signals if a process has been added to the process list. If a processor adds a process to the process list this will be immediately signalled via the cache coherence protocol to the cache memory units of the processors causing the processors to switch from low-power mode into the normal-power mode.

Preferred embodiments of the invention are defined in the dependent claims. A processor for use in such a multi-processor computer system is defined in claim 6. A method of scheduling the execution of processes is defined in claim 7. A method of executing a process by a processor is defined in claim 8. A computer program for implementing said methods is defined in claim 9. It should be noted that these devices and methods as well as the computer program can be developed further in a similar or identical way as defined in the dependent claims of claim 1.

According to a first preferred embodiment as defined in claim 2 switching into the normal-power mode of the processors is caused by a change of the wake-up variable due to an addition of a process to the process list. A processor adding a process to the process list thus simply has to change the wake-up variable, e.g. by executing a store command as claimed according to the preferred embodiment of claim 3 and writing any new value into said variable. This will immediately be signalled to all cache memory units holding said wake-up variable causing a switching of the associated processors from low-power mode into normal-power mode.

According to another aspect of the invention the processors are adapted to send a request to other processors to drop the wake-up variable from their associate cache memory unit when adding a process to said process list. Also in this way other processors will immediately be informed of an addition of a new process to the process list and thus switch into the normal-power mode in which they will try to get the process from the process list for execution.

Preferably, an invalidation-based cache coherence protocol is implemented in the multi-processor computer system according to the invention. This means that on a read command from a memory unit other cache memory units are checked to see whether they contain a more up to date version of the data than is in the memory unit. If this is the case the processor holding the more up to date version of the data provides it to the memory. On a write command to data in a cache memory unit, other processors are checked to see whether they cache the same data item. If this is the case, they should invalidate the data item, i.e. remove it from their cache memory unit. Regarding more details of cache coherence protocols, and, in particular, invalidation-based cache coherence protocols reference is made to John L. Hennessy and David A. Patterson, "Computer architecture, a quantitative approach", Morgan Kaufman Publishers, second edition, in particular chapter 8.3.

Figure 2:
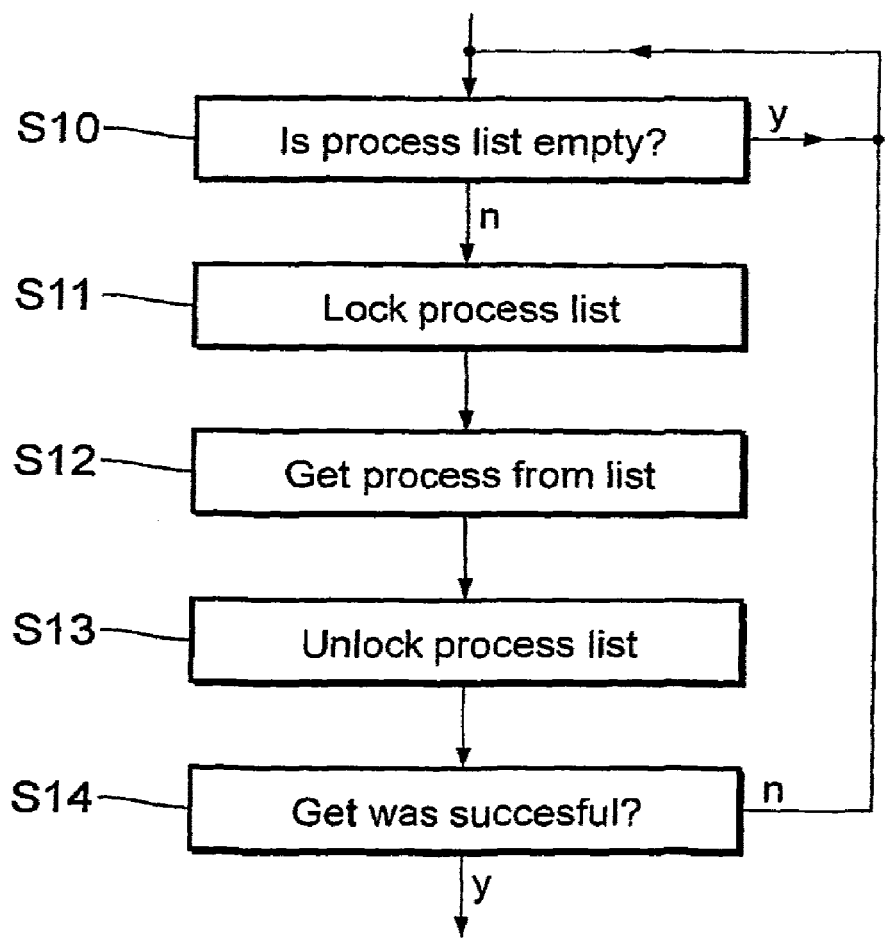
Figure 3:
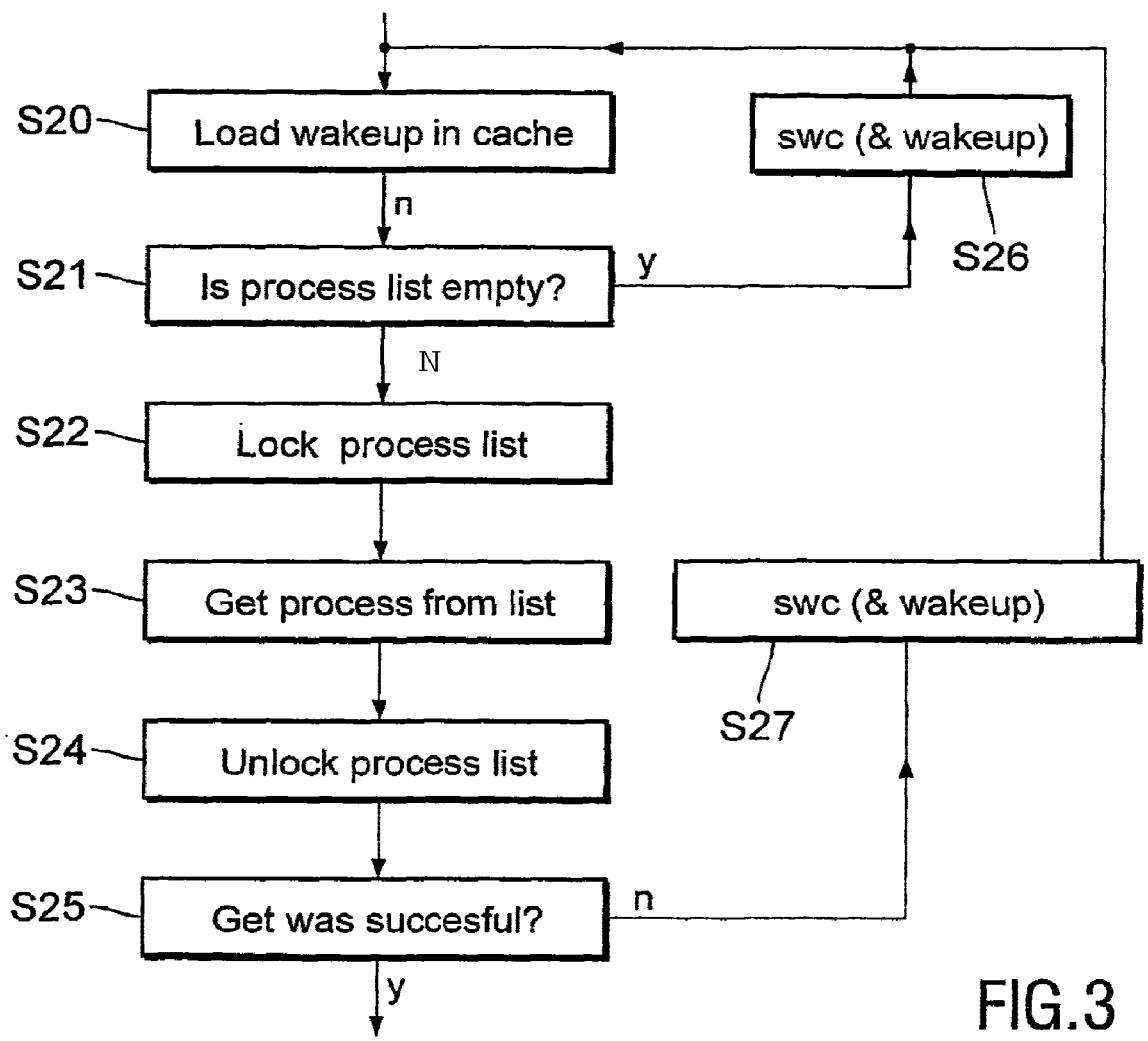
Figure 4:
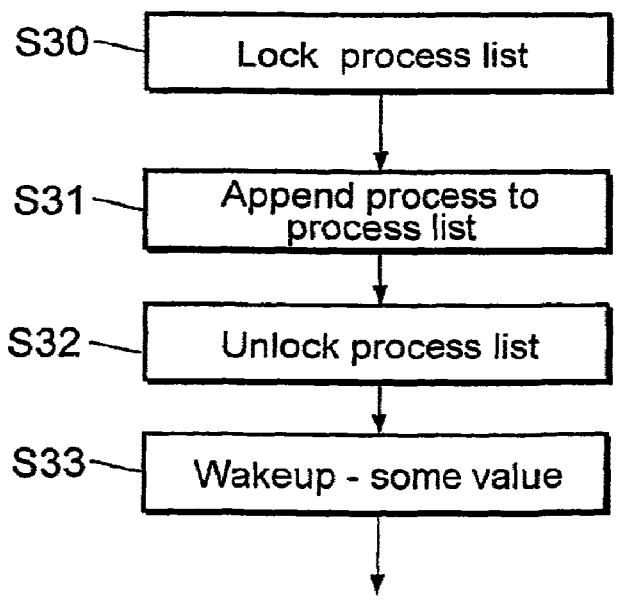
Figure 5:
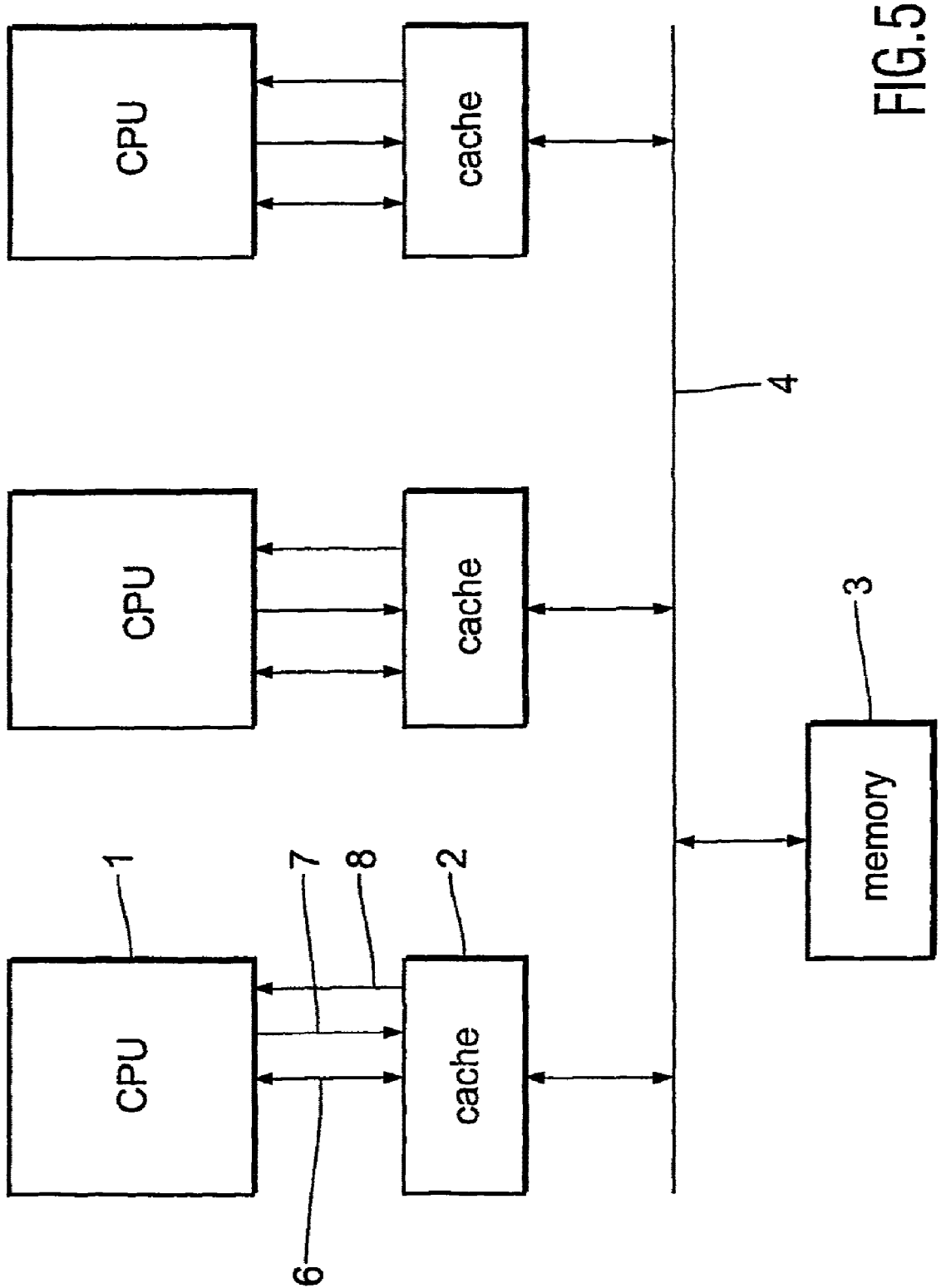

The invention will now be explained in more detail with reference to the drawings in which FIG. 1 shows a block diagram of a known multi-processor computer system, FIG. 2 shows a flow chart of known method of scheduling the execution of processes, FIG. 3 shows a flow chart of a method of scheduling the execution of processes according to the invention, FIG. 4 shows a flow chart of the method of adding a process to a process list according to the invention, and FIG. 5 shows a block diagram of a multi-processor computer system according to the invention.

FIG. 1 shows a block diagram of a known multi-processor computer system. Said computer system comprises a number of, in the present embodiment four, processors 1, so-called central processing units (CPU), to each of which a cache memory unit 2 is associated and connected. Further, a shared memory unit 3, for instance a random access memory unit, comprising a list of processes to be executed by said processors 1 is provided. The processors 1 are interconnected via the cache memory units 2 through an interconnection line 4, such as a bus, to which the memory unit 3, which may also be regarded as comprising a process list unit, are also connected.

A known method of scheduling the execution of processes in such a multi-processor computer system is illustrated as flow chart in FIG. 2. The selection of a ready process, i.e. a process that is ready for execution by a processor, consists of waiting until a process appears in a list of ready processes called "process list" (step S10). Multiple processors can be waiting for this so that the process list has to protected by a lock since otherwise it is possible that, before the processor takes the ready process from the list, it is taken by another processor (S11). The ready process is then taken from the list in step S12, where after the process list is unlocked again for access of other processors which are trying to get processes for execution (S13). In case the processor was successful in getting a process for execution from the process list (S14) it will execute this process, while in the negative case it returns to the beginning where it is set into the state of trying to get a process from the process list. The processors that are currently not executing a process are therefore continuously checking if the process list is empty (S10) as a kind of stand-by state or spin loop.

FIG. 3 shows an embodiment of a method of scheduling the execution of processes according to the present invention in the form of a flow chart. According to the invention a global variable "wake-up" that is used to signal additions to the process list is introduced. It shall be assumed that, for the beginning, a processor is in a normal-power mode and looking for a ready process. In a first step S20 the processor loads the cache line containing the wake-up variable into its cache memory if it is not already there by use of a normal load instruction. Next, the processor checks whether the process list is empty (S21). If the processor has found a ready process in the process list in step S21, it first locks the process list in step S22 to prevent access to said process list by other processors. Next, the processor gets the process from the process list (S23), where after the process list is unlocked again (S24).

If step S23 was successful the processor will execute the taken process (S25). The context of that process is restored and the process continues execution.

If step S23 was not successful, a so-called sleep-while-cached (swc) instruction will be executed (S27) with the wake-up variable as parameter. This means that the processor switches from its normal-power mode into a low-power mode, i.e. in some kind of sleeping mode, in which it remains as long as the wake-up variable is in its associated cache memory unit or, to be more precise, as long as the cache line of its cache memory unit holds the wake-up variable. The same swc instruction is executed in case step S21 gives a positive results, i.e. if the process list is found empty (S26).

If, as shown in FIG. 4, another processor appends a process to the process list for execution it first locks the process list (S30), before it actually appends the process (S31). After unlocking the process list again (S32), a store command will be performed on the wake-up variable, i.e. a new value will be assigned to the wake-up variable (S33). This will immediately signal to all processors being in a low-power mode that a new process has been added to the process list and will cause an invalidation of the cache line in the cache memory units of such processors which then switch back from low-power mode to normal-power mode and start again with step S20 (see FIG. 3).

By this method much power can be saved since processors not executing a process are not waiting in a spin loop in normal-power mode but are switched into a low-power mode. However, since according to the present invention a cache coherence protocol is used for signalling additions of processes to the process list using said wake-up variable held in the cache memory units of sleeping processors, the wake-up procedure is very fast, in particular faster than using interrupts.

A block diagram of a multi-processor computer system in which the invention is implemented is shown in FIG. 5. Between the processor 1 and the cache memory unit 2 additional communication lines 7, 8 besides the normal data path 6 are added according to the present invention. Communication line 7 is used to communicate a wake-up address from the processor 1 to the cache memory unit 2, i.e. to pass the address specified by the swc instruction to the cache memory unit 2. Communication line 8 is used to communicate a wake-up signal from the cache memory unit 2 to the processor 1 to cause it to switch from low-power mode to normal-power mode, when the specified address disappears from the cache memory unit.

If, in step S33 of FIG. 4, a processor stores an arbitrary value to the wake-up variable which is a normal store instruction the following happens. If another processor is looking for a ready process then that processor has the wake-up variable in its cache memory unit, meaning that the cache contains the cache line that corresponds to the memory block in which the wakeup variable is stored. If another processor is caching the wake-up variable then the processor intending to store an arbitrary value to the wake-up variable can not modify the wake-up variable by means of such a store instruction since the cache coherence protocol prevents this. In order to do the store operation the processor sends out a broadcast to all other processor with a request to drop the wake-up variable from their cache memory unit. In terms of the cache coherence protocol, in particular of the MSI, MESI or MOESI type, the processor makes a transition from shared or invalid to modified state. This causes processors that were sleeping after an swc instruction to wake-up and switch into the normal-power mode. These processors will then check the process list, and one of them will be successful in getting the just added process. The others will switch back into the low-power mode according to the swc instruction.

It should be noted that a processor loads the wake-up variable before trying to get a process from the process list. Doing this in the reverse order might lead to the situation that the processor switches to the low-power mode while there is a ready process in the process list.

Besides for saving power in the process scheduler the swc instruction according to the present invention as explained above could be useful for other purposes where fast synchronisation between processors is required. While many processors have instructions to switch to low-power sleep mode there is no processor and no multi-processor computer system known that is able to wake-up and switch into the normal-power mode because of cache coherence transactions as proposed according to the present invention which provides a very fast and effective solution.

The invention claimed is:

1. Multi-processor computer system comprising at least two processors (1) for parallel execution of processes, at least two cache memory units (2), each being associated with and connected to a separate processor (1) of the at least two processors, a connection bus (4) connecting said processors (1) and said cache memory units (2), and a process list unit (3) connected to said connection bus (4) for storing a process list of processes to be available for execution by said processors (1), wherein said processors (1) are adapted for loading a global wake-up variable signaling process additions of processes to said process list into their associated cache memory unit (2), for switching into a low-power mode if said process list contains no process for execution by said processors (1) and for switching into a normal-power mode if said wake-up variable signals an addition of a process to said process list.

2. Multi-processor computer system as claimed in claim 1, wherein said processors (1) are adapted to switch into the normal-power mode if the wake-up variable held in the associated cache memory units (2) is changed due to an addition of a process to said process list.

3. Multi-processor computer system as claimed in claim 1, wherein said processors (1) are adapted to execute a store command on the wake-up variable when adding a process to said process list.

4. Multi-processor computer system as claimed in claim 1, wherein said processors (1) are adapted to send a request to other processors to drop the wake-up variable from their associated cache memory unit when adding a process to said process list.

5. Multi-processor computer system as claimed in claim 1, wherein said computer system is adapted for implementing an invalidation based cache coherence protocol.

6. Processor for use in a multi-processor computer system comprising at least two processors (1) for parallel execution of processes, at least two cache memory units (2), each being associated with and connected to a separate processor (1) of the at least two processors, a connection bus (4) connecting said processors (1) and said cache memory units (2), and a process list unit (3) connected to said connection bus (4) for storing a process list of processes to be available for execution by said processors (1), wherein a processor (1) of the at least two processors is adapted for loading a global wake-up variable signaling process additions of processes to said process list into its associated cache memory unit (2), for switching into a low-power mode if said process list contains no process for execution by said processor and for switching into a normal-power mode if said wake-up variable signals an addition of a process to said process list.

7. Method of scheduling the execution of processes in a multi-processor computer system comprising at least two processors (1) for parallel execution of processes, at least two cache memory units (2), each being associated with and connected to a separate processor of the at least two processors (1), a connection bus (4) connecting said processors (1) and said cache memory units (2), and a process list unit (3) connected to said connection bus(4) for storing a process list of processes to be available for execution by said processors (1), said method comprising the steps of: loading a global wake-up variable signaling process additions of processes to said process list by a processor (1) into its associated cache memory unit (2), adding a process to said process list, and changing the wake-up variable signaling said addition of a process to said process list thus causing said processor (1) to switch from a low-power mode into a normal-power mode.

8. Method of executing a process by a processor in a multi-processor computer system comprising at least two processors (1) for parallel execution of processes, at least two cache memory units (2), each being associated with and connected to a separate processor (1) of the at least two processors, a connection bus (4) connecting said processors (1) and said cache memory units (2), and a process list unit (3) connected to said connection bus (4) for storing a process list of processes to be available for execution by said processors (1), said method comprising the steps of: loading a global wake-up variable signaling process additions of processes to said process list into an associated cache memory unit (2), switching into a low-power mode if said process list contains no process for execution by said processor (1), switching into a normal-power mode if said wake-up variable signals an addition of a process to said process list, and accessing said process list to get said added process for execution.

* * * * *